(12) United States Patent
Ito

(10) Patent No.: US 7,804,214 B2
(45) Date of Patent: Sep. 28, 2010

(54) BEARING HOLDER AND MOTOR HAVING BEARING THE SAME

(75) Inventor: Noriyuki Ito, Nagoya (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 207 days.

(21) Appl. No.: 12/119,776

(22) Filed: May 13, 2008

(65) Prior Publication Data

US 2008/0285900 A1 Nov. 20, 2008

(30) Foreign Application Priority Data

May 16, 2007 (JP) ............... 2007-130280

(51) Int. Cl.
*H02K 5/16* (2006.01)
(52) U.S. Cl. ........................ 310/90; 310/239
(58) Field of Classification Search .......... 310/90, 310/239, 91
See application file for complete search history.

(56) References Cited

U.S. PATENT DOCUMENTS 5,650,678 A * 7/1997 Yokozawa et al. ............ 310/90

2004/0160138 A1 * 8/2004 Kuroda et al. ............ 310/90

FOREIGN PATENT DOCUMENTS

| JP | 3266500 B2 | 1/2002 |
| JP | 3487066 B2 | 10/2003 |
| JP | 2007-267448 A | 10/2007 |
| JP | 2007-267490 A | 10/2007 |

* cited by examiner

*Primary Examiner*—Nguyen N Hanh
(74) *Attorney, Agent, or Firm*—Sughrue Mion, PLLC

(57) ABSTRACT

A motor includes a bearing and a bearing holder. The bearing is employed for rotatably supporting a motor shaft. The bearing holder is formed of a resin material and adapted to retain the bearing. Further, the bearing holder includes a cylindrical portion to which the bearing is press-fitted and a planar portion which is formed integrally with the cylindrical portion and is adapted to be arranged perpendicularly to the motor shaft. The cylindrical portion includes a first slit extending in an axial direction. The planar portion includes a second slit extending continuously with the first slit of the cylindrical portion.

8 Claims, 3 Drawing Sheets

BEARING HOLDER AND MOTOR HAVING BEARING THE SAME

CROSS REFERENCE TO RELATED APPLICATIONS

This application is based on and claims priority under 35 U.S.C. §119 to Japanese Patent Application 2007-130280, filed on May 16, 2007, the entire content of which is incorporated herein by reference.

FIELD OF THE INVENTION

The present invention relates to a bearing holder and a motor having the bearing holder.

BACKGROUND

As one of a motor including a bearing bolder made of resin material JP3487066B discloses a motor, in which a bearing holder is integrally formed at one surface of a disc shaped brush holder. An outer diameter of the brush bolder is arranged to be entirely, or partially, larger than an inner diameter of a frame. An inner diameter of a bearing housing is arranged to be entirely, or partially, smaller than an outer diameter of the bearing. Further, thickness of the inner bearing holder is arranged to be one-third to one-half the thickness of the bearing.

Further, JP3266500B discloses a motor including a bearing rotatably supporting a shaft and a bearing holder for retaining the bearing. The bearing holder is made of thermoplastic resin including glass fiber and is formed by injection molding. A linear expansion coefficient in an axial direction of the motor is defined to be equal to or lower than $3.0 \times 10^{-5}/°C$. Further, a linear expansion coefficient in a vertical direction relative to the axial direction is equal to or greater than the double of the linear expansion coefficient.

However, because compressive strength of the bearing holder made of the known resin material is lower than that of the bearing bolder made of metal material, a cylindrical portion of the bearing holder may be broken, or cracked, when press-fitting the bearing into the bearing holder. Therefore, in order to prevent the cylindrical portion of the bearing holder from being damaged (cracked), there is a requirement for high fitting dimensional accuracy between the bearing and the bearing holder and for a form designing and a manufacturing process taking into account a linear expansion of the resin material and a resin flow when molding the bearing holder. Further, there is a requirement for employing a resin material having high extension degree despite having inferior heat resistance and mechanical strength performance so as to prevent the cylindrical portion of the bearing holder from being damaged when press-fitting the bearing.

A need thus exists or a motor including a bearing holder, which is not susceptible to the drawback mentioned above.

SUMMARY OF THE INVENTION

According to an aspect of the present invention, a motor includes a bearing and a bearing holder. The bearing is employed for rotatably supporting a motor shaft. The bearing holder is formed of a resin material and adapted to retain the bearing. Further, the bearing holder includes a cylindrical portion to which the bearing is press-fitted and a planar portion which is formed integrally with the cylindrical portion and is adapted to be arranged perpendicularly to the motor shaft. The cylindrical portion includes a first slit extending in an axial direction. The planar portion includes a second slit extending continuously with the first slit of the cylindrical portion.

Still further according to another aspect of the present invention, a bearing holder, which is formed of a resin material and is adapted to be mounted to a motor including a bearing, includes a cylindrical portion adapted to be press-fitted by the bearing and a planar portion formed integrally with the cylindrical portion and adapted to be arranged perpendicularly to a motor shaft. The cylindrical portion includes a first slit extending in an axial direction. The planar portion includes a second slit extending continuously with the first slit of the cylindrical portion

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment of the present invention will be described hereinafter with reference to FIGS. 1 to 5.

Figure 1:
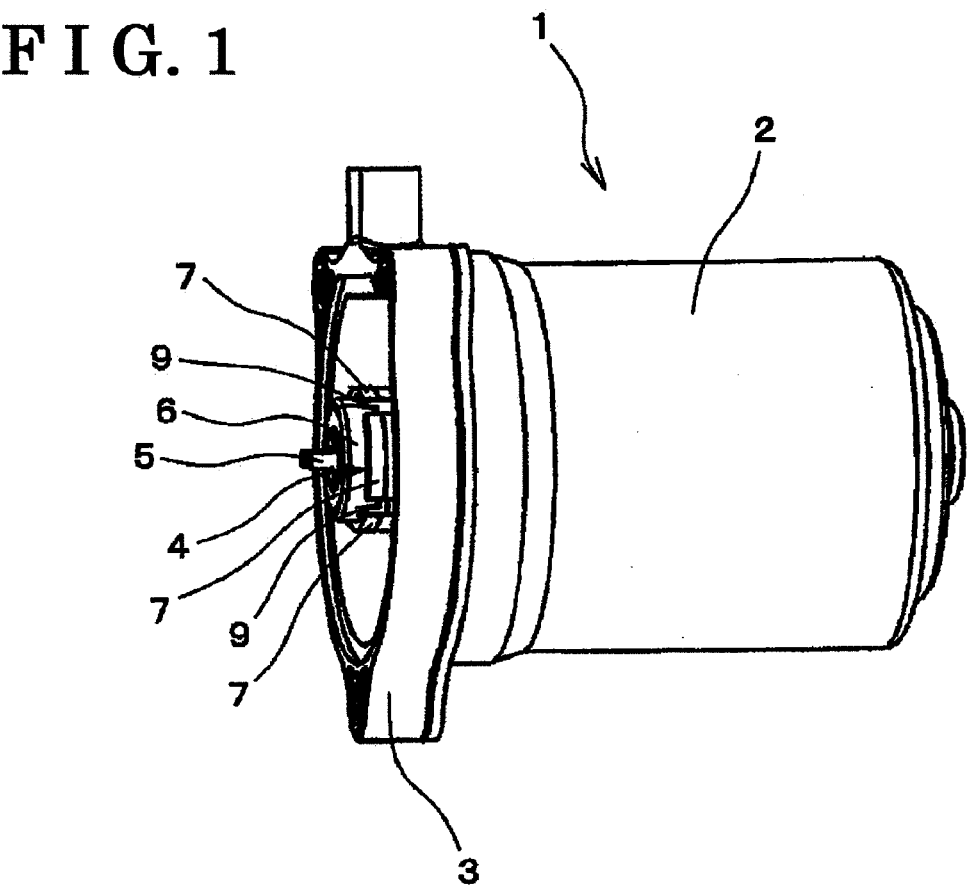
FIG. 1 is an outline view illustrating a motor according to an embodiment.

FIG. 1 is an outline view illustrating a motor, generally indicated by the reference numeral 1. The motor 1 includes a yoke case 2, a brush holder 3, a bearing holder 4 and a bearing 6. The brush holder 3 is assembled on a first end of the yoke case 2. The bearing holder 4, which is made of PPS (polyphenylene sulfide) material, is employed for retaining the bearing 6. The bearing 6 rotatably supports a motor shaft 5.

Figure 2:
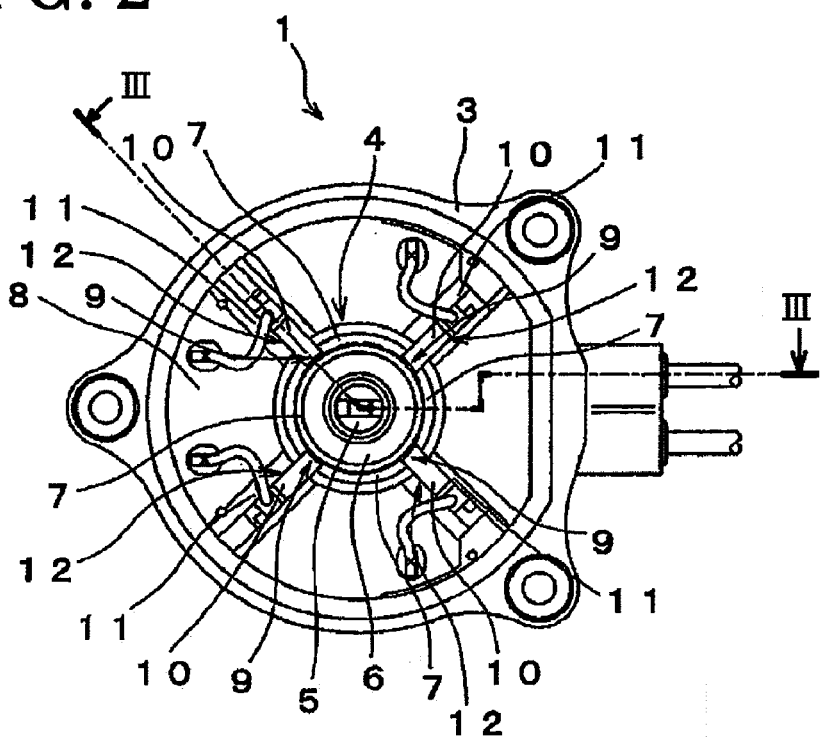
FIG. 2 is a front view illustrating the motor according to the embodiment.

FIG. 2 is a front view illustrating the motor I. The bearing holder 4 includes a cylindrical portion 7 and a holder planar portion 8. The bearing 6 is press-fitted into a first axial end of the cylindrical portion 7. The holder planar portion 8 is integrally formed with the cylindrical portion 7 of the bearing holder 4. Further, the holder planar portion 8 includes a planar surface vertically arranged relative to the motor shaft 5. The cylindrical portion 7 of the bearing holder 4 includes four slits 9 (each serving as a first slit). The slits 9 extend in an axial direction of the cylindrical portion 7 and divide the cylindrical portion 7 into four sections in a circumferential direction. The holder planar portion 8 is provided with four brush accommodating portions 11, which is employed for retaining four brushes 10 to be slidable in a radial direction about the motor shaft 5, respectively. Thus, the brush holder 3 and the bearing holder 4 are formed integrally. The brush accommodating portions 11 are provided with slits 12 (each serving as a second slit), respectively. The slits 9 of the cylindrical portion 7 and the slits 12 of the brush accommodating portion 11 are formed continuously, respectively.

Figure 3:
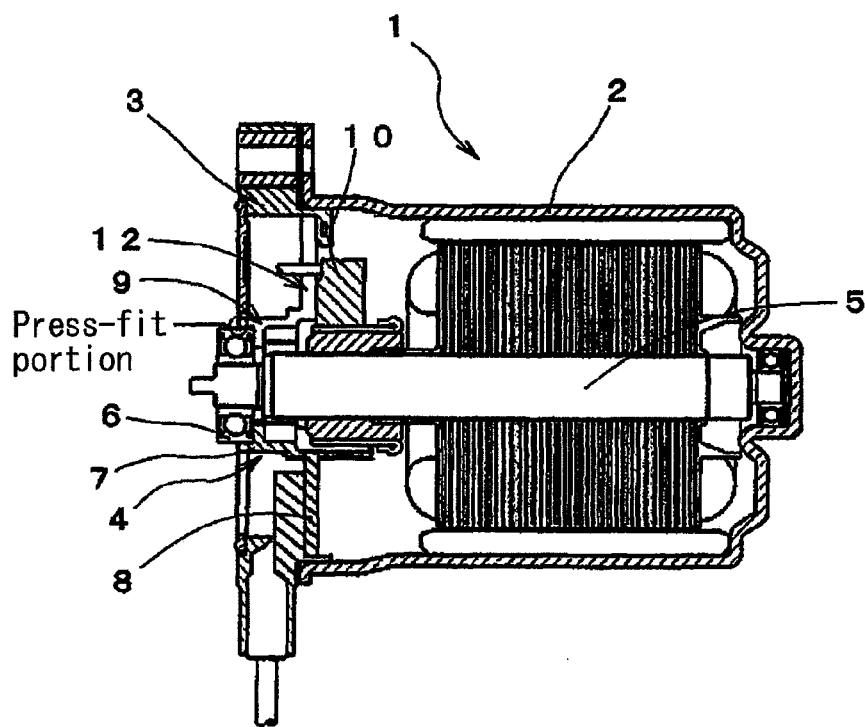
FIG. 3 is a cross sectional view of the motor taken along line III-III in FIG. 2.

FIG. 3 is a cross sectional view illustrating the motor 1 taken along line III-III in FIG. 1. The bearing 6 is press-fitted into the first axial end of the cylindrical portion 7 of the bearing holder 4. The holder planar portion 8 is integrally formed at a second axial end of the cylindrical portion 7 of the bearing holder 4.

Figure 4:
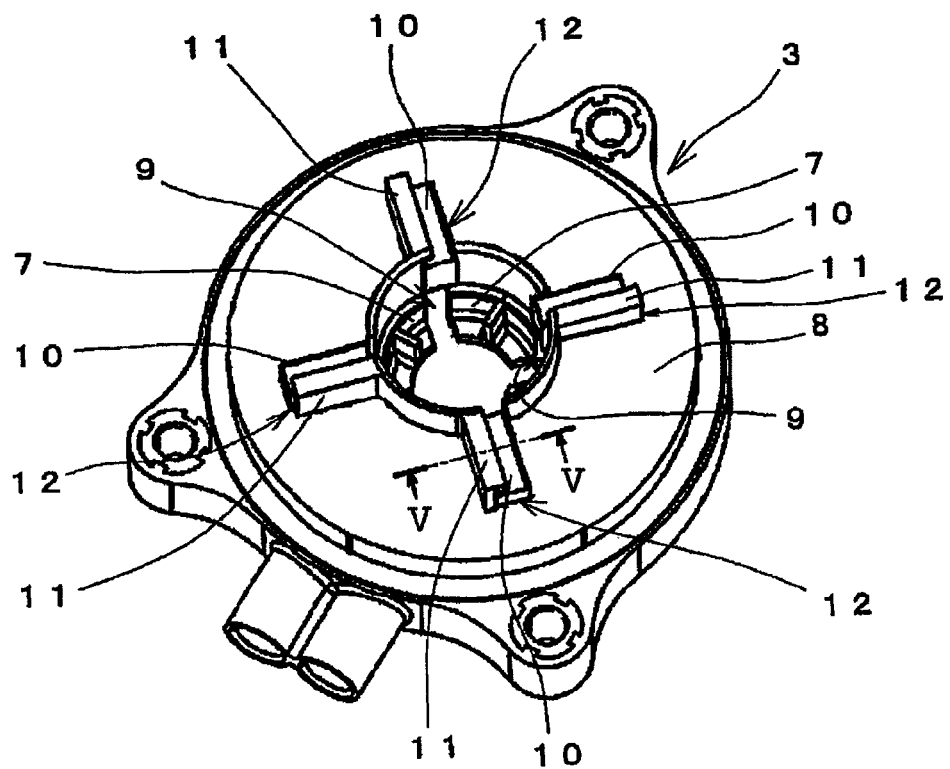
FIG. 4 is an outline view illustrating a brush holder of the motor viewed from a back surface by removing the brush holder from a yoke case.

FIG. 4 is an outline view illustrating the brush holder 3 removed from the yoke case 2 and viewed from a back surface (from a right side surface in FIG. 1). As illustrated therein, the brush accommodating portions 11 extend in an axial direction (i.e., towards a right side in FIG. 3) from the holder planar portion 8, which is a direction opposite of the cylindrical portion 7. Each brush accommodating portion 11 is formed with the slit 12. More specifically, each slit 12 is defined at the holder planar portion 8 and extends continuously from the holder planar portion 8 to an axially protruded L-shaped end of each of the brush accommodating portions 11. Further, the slit 12 extends continuously with the corresponding slit 9 of the cylindrical portion 7, thus forming an integral slit from the cylindrical portion 7 to the holder planar portion 8 and further to the brush accommodating portion 11.

Figure 5:
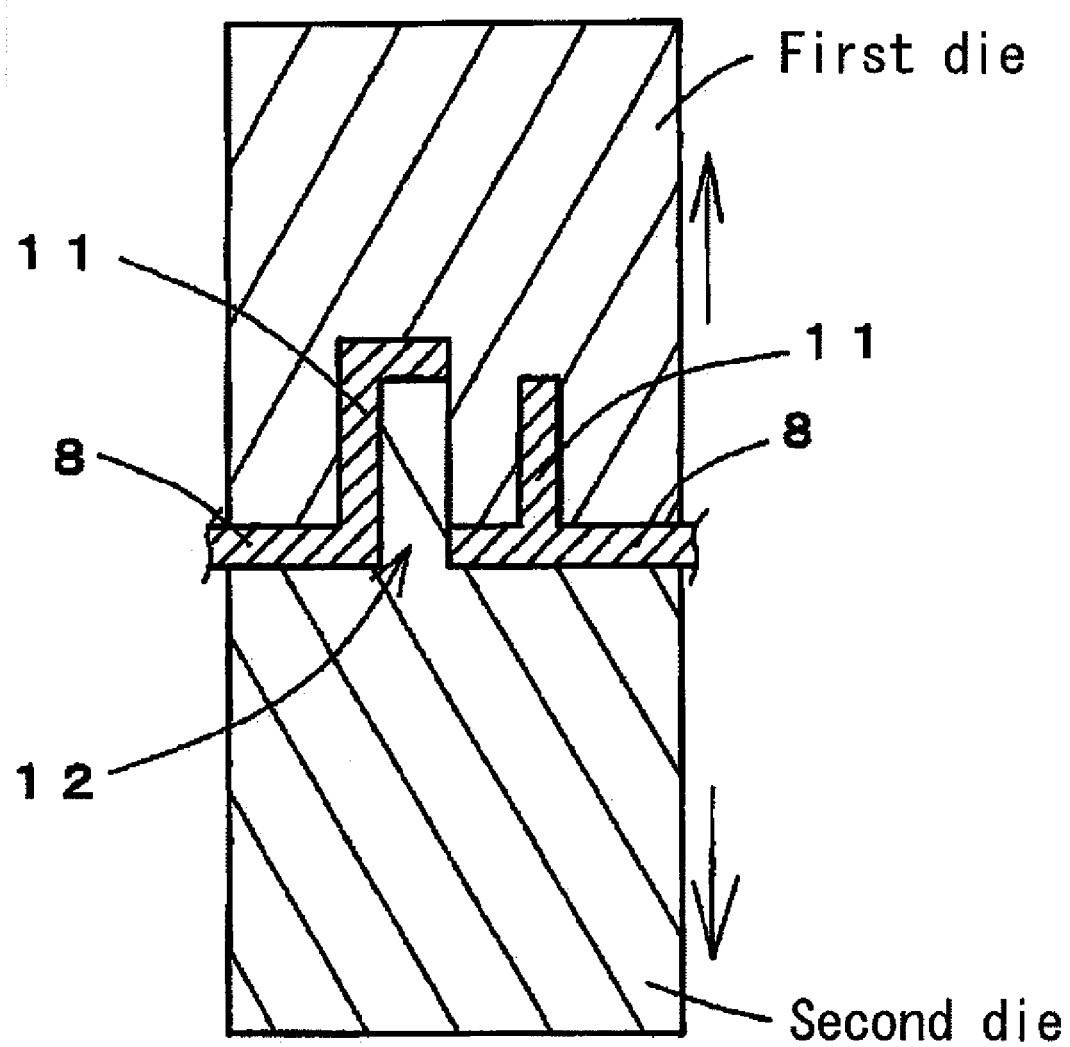
FIG. 5 is a cross sectional view illustrating a brush accommodating portion of the motor taken along line V-V in FIG. 4, schematically illustrating a process for molding the brush accommodating portion.

FIG. 5 is a cross sectional view of the brush accommodating portion 11 taken along line V-V in FIG. 4 and schematically illustrating a process for forming the brush accommodating portions 11. As illustrated therein, because the brush accommodating portion 11 is formed in an L shape, for example, the brush accommodating portion 11 including the slit 12 is formed in one process by first and second dies. More specifically, the bearing holder 4 including the brush accommodating portions 11 is formed by, for example, an injection molding in one process by means of the first and second dies. As is apparent from FIG. 5, the first die is employed for forming a first axial surface portion (an upper surface portion in FIG. 5) of the bearing holder 4, and the second die is employed for forming a second axial surface portion (a lower surface portion in FIG. 5) of the bearing holder 4.

In the motor 1 of the present embodiment, because the cylindrical portion 7 of the bearing holder 4 is divided into the four sections in the circumferential direction by the four slits 9, a press-fit portion of the cylindrical portion 7 is circumferentially expanded when press-fitting the bearing 6 into the cylindrical portion 7. Therefore, high fitting dimensional accuracy between the bearing holder 4 and the bearing 6 is not required. Further, because each of the slits 9 formed at cylindrical portion 7 and the corresponding slits 12 formed at the holder planar portion 8 are continuously formed, acting force generated when the bearing 6 is press-fitted into the cylindrical portion 7 of the bearing holder 4 is absorbed by the slits 9 and the slits 12. Therefore, the high acting force is prevented from being generated at particular portions and the PPS material is prevented from being damaged, or cracked. Further, the bearing holder 4 is not formed in a complicated shape and is not manufactured by any particular process. Further, other resin material (such as phenol resin, for example), which includes high heat resistance and high mechanical strength, may be used for the bearing holder 4 in place of the PPS material.

Still further, the brush accommodating portion 11 including the slits 12 is integrally formed with the holder planar portion 8, hence leading to reduce a size of the motor 1.

Still further, because the bearing 6 is press-fitted into the first axial end of the cylindrical portion 7 and the holder planar portion 8 is integrally formed at the second axial end of the cylindrical portion 7, the acting force generated by press-fitting the bearing 6 into the first axial end of the cylindrical portion 7 is absorbed by the slits 9, each of which extends towards the second axial end of the cylindrical portion 7, and by the slits 12, each of which radially extends from the motor shaft 5 of the holder planar portion 8.

Further, the brush accommodating portion 11 is formed in one process by means of the first and second dies without any particular process, such as cutting process. Therefore, a cost for manufacturing the bearing holder 4 is reduced.

The motor 1 according to the above described embodiment includes the brushes 10. Alternatively, the motor 1 may be applied to a brushless motor. Further, the resin material for forming the bearing holder 4 is not limited to the PPS (polyphenylene sulfide). Alternatively, other resin material, such as the phenol, which includes the high heat resistance and high mechanical strength, may be employed for the bearing holder 4.

According to the above described embodiment, the motor 1 includes the brush 10. Further, the planar portion 7 of the bearing holder 4 includes the brush accommodating portion 11 for retaining the brush 10 to be radially slidable, and the slit 12 of the planar portion 8 is defined at the brush accommodating portion 11.

Further according to the above described embodiment, the bearing 6 is press-fitted into the first axial end of the cylindrical potion 7 of the bearing holder 4, and the planar portion 8 of the bearing holder 4 is integrally formed at the second axial end of the cylindrical portion 7.

Still further according to the above described embodiment, the brush accommodating portion 11 is formed in one process by the first and second dies.

Still further according to the above described embodiment, the bearing holder 4 includes the brush accommodating portion 11, which is formed at the planar portion 7 and is adapted to radially slidably retain the brush 10 of the motor 1. Further, the slit 12 of the planar portion 8 is defined at the brush accommodating portion 11.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A motor comprising:
a bearing for rotatably supporting a motor shaft; and
a bearing holder formed of a resin material and adapted to retain the bearing, the bearing holder including a cylindrical portion to which the bearing is press-fitted and a planar portion formed integrally with the cylindrical portion and adapted to be arranged perpendicularly to the motor shaft,
wherein the cylindrical portion includes a first slit extending in an axial direction and the planar portion includes a second slit extending continuously with the first slit of the cylindrical portion, and said motor further comprising:
a brush,
wherein the planar portion of the bearing holder includes a brush accommodating portion for retaining the brush to be radially slidable, and the second slit of the planar portion is defined at the brush accommodating portion.

2. A motor according to claim 1, wherein
the bearing is press-fitted into a first axial end of the cylindrical potion of the bearing holder, and the planar portion of the bearing holder is integrally formed at a second axial end of the cylindrical portion of the bearing holder.

3. A motor according to claim 2, wherein the brush accommodating portion is formed in one process by first and second dies.

4. A motor according to claim 1, wherein the brush accommodating portion is formed in one process by first and second dies.

5. A bearing holder formed of a resin material and adapted to be mounted to a motor including a bearing, comprising:

a cylindrical portion adapted to be press-fitted by the bearing; and a planar portion formed integrally with the cylindrical portion and adapted to be arranged perpendicularly to a motor shaft, wherein the cylindrical portion includes a first slit extending in an axial direction and the planar portion includes a second slit extending continuously with the first slit of the cylindrical portion, said bearing holder further comprising:

a brush accommodating portion formed at the planar portion and adapted to radially slidably retain a brush of the motor, wherein the second slit of the planar portion is defined at the brush accommodating portion.

6. A bearing holder according to claim 5, wherein the bearing of the motor is press-fitted into a first axial end of the cylindrical portion, and the planar portion is integrally formed at a second axial end of the cylindrical portion.

7. A bearing holder according to claim 6, wherein the brush accommodating portion is formed in one process by first and second dies.

8. A bearing holder according to claim 5, wherein the brush accommodating portion is formed in one process by first and second dies.

* * * * *